United States Patent [19]

Sztanko et al.

[11] Patent Number: 5,363,136
[45] Date of Patent: Nov. 8, 1994

[54] CAM ACTUATED OPTICAL OFFSET IMAGE SAMPLING SYSTEM

[75] Inventors: Nicholas Sztanko, Rochester; Stephen P. Smith, Victor; William B. Jones, Rochester, all of N.Y.

[73] Assignee: Eastman Kodak Company, Rochester, N.Y.

[21] Appl. No.: 957,567

[22] Filed: Oct. 7, 1992

[51] Int. Cl.⁵ .......................................... H04N 5/225
[52] U.S. Cl. ................................... 348/207; 348/270; 348/340; 348/344
[58] Field of Search .................. 358/213.28, 213.11, 358/225, 213.26, 44; 348/340, 311, 270, 207, 344

[56] References Cited

U.S. PATENT DOCUMENTS

| | | | |
|---|---|---|---|
| 634,560 | 10/1899 | Lumiere | 358/225 |
| 1,760,198 | 5/1930 | Hough | 358/21 |
| 4,333,112 | 6/1982 | Matsumoto | 358/298 |
| 4,449,213 | 5/1984 | Noborimoto et al. | 369/45 |
| 4,517,603 | 5/1985 | Epsztein et al. | 358/213 |
| 4,543,601 | 9/1985 | Harada et al. | 358/213 |
| 4,581,649 | 4/1986 | Morokawa | 358/212 |
| 4,595,954 | 6/1986 | Endo et al. | 358/213 |
| 4,607,287 | 8/1986 | Endo et al. | 358/213 |
| 4,613,202 | 9/1986 | Kuriyama | 350/6.4 |
| 4,633,317 | 12/1986 | Uwira et al. | 358/213 |
| 4,638,371 | 1/1987 | Milch | 358/293 |
| 4,652,928 | 3/1987 | Endo et al. | 358/213 |
| 4,707,743 | 11/1987 | Tokumitsu et al. | 358/225 |
| 4,755,876 | 7/1988 | Dangler | 358/264 |
| 4,786,964 | 11/1988 | Plummer et al. | 358/213.28 |
| 4,910,413 | 3/1990 | Tamune | 358/213.28 |
| 4,920,418 | 4/1990 | Robinson | 358/213.28 |
| 4,922,333 | 5/1990 | Nutting et al. | 358/78 |
| 4,967,264 | 10/1990 | Parulski et al. | 358/44 |
| 5,063,450 | 11/1991 | Pritchard | 358/213.28 |

FOREIGN PATENT DOCUMENTS

| | | | |
|---|---|---|---|
| 58-56581 | 4/1983 | Japan | H04N 5/30 |
| 58-162171 | 9/1983 | Japan | H04N 5/30 |
| 57-013476 | 1/1984 | Japan | 358/213.28 |
| 59-13476 | 1/1984 | Japan | H04N 5/30 |
| 59-15376 | 1/1984 | Japan | H04N 5/26 |
| 59-15377 | 1/1984 | Japan | H04N 5/26 |
| 59-15378 | 1/1984 | Japan | H04N 5/26 |
| 59-22485 | 2/1984 | Japan | H04N 5/30 |
| 60-223388 | 11/1985 | Japan | 358/213.28 |
| 62-308098 | 6/1989 | Japan | H04N 5/335 |
| WO90/05424 | 5/1990 | WIPO | H04N 1/46 |

OTHER PUBLICATIONS

Serial No. 815,479, Apparatus for Mechanically Dithering a CCD Array; Inventor: Russell Palum; filed Dec. 31, 1991.

Patent application entitled Lever Actuated Optical Offset Image Sampling System; Inventors: Dean Johnson, William Mitchell,. Stephen P. Smith.

*Primary Examiner*—Joseph Mancuso
*Assistant Examiner*—Wendy R. Greening
*Attorney, Agent, or Firm*—David M. Woods

[57] ABSTRACT

The system of the present invention increases the resolution of an image that may be formed from an image sensor without increasing the resolution of the sensor. An image beam is directed along a path through a color filter wheel and a single non-rotating transparent plate and impinges on a CCD (Charge Coupled Device). A cam body with an angled surface rotates about the optical axis of the image beam and tilts the transparent plate in a plurality of discrete sampling positions. At each sampling position, the tilted transparent plate displaces the image beam in a different direction. Therefore, each pixel of the CCD samples a plurality of areas of the image. The color wheel is rotated to sequentially place each filter into the path of the image beam. The CCD sequentially receives the light passed through the transparent plate and color filter wheel and converts the image formed by the light to corresponding electrical signals. The electrical signals are stored and reordered by interleaving to form an image with increased resolution.

21 Claims, 4 Drawing Sheets

CAM ACTUATED OPTICAL OFFSET IMAGE SAMPLING SYSTEM

CROSS REFERENCE TO RELATED APPLICATION

The present application is related to the application titled, "Lever Actuated Optical Offset Image Sampling System" by Johnson et al U.S. Ser. No. 07/957,980, filed on even date by same assignee.

FIELD OF INVENTION

The present invention relates to an optical imaging system for transforming a fixed image to an electrically storable image. More particularly, the invention relates to an optical sampling system with increased resolution.

BACKGROUND OF THE INVENTION

In a typical imaging system, an image beam is directed through a lens and onto an image sensor, for example a CCD (Charge Coupled Device), comprised of an array of sensing elements. These sensing elements, generally referred to as "picture elements" or "pixels", are arranged in rows and columns. As the array is scanned, the electrical output signal from each pixel is processed and used to produce a display, for example on a television monitor. Therefore, the resolution of such a display is a direct function of the number of pixels in the array of rows and columns. For example, an image sensor having 500 horizontal pixels per row will have a lower resolution than an image sensor which has 1,000 pixels per row. Increasing the number of pixels will increase the resolution. However, this will also increase the size of the image sensor. Therefore, other methods are sought to increase the resolution of an image without increasing the size of the image sensor.

One method is to scan the array multiple times while shifting the position of the image with respect to the image sensor between each scan. By shifting the image position, each pixel of the image sensor will capture information on several adjacent areas of the image. Thus, a low resolution array can be used to produce a high resolution image.

U.S. Pat. No. 4,920,418, "Imaging System Having a Swing-Driven Image Sensor" by Robinson discloses an apparatus for improving the resolution and reducing the optical alias of interlaced imaging systems which include a solid state image sensor. In one embodiment, the apparatus comprises a glass plate mounted on piezoelectric bimorphs. When a voltage is applied, the bimorphs tilt the glass plate between two positions corresponding to two fields such that the image passing through the glass plate is shifted relative to an image sensor. The images are scanned by the image sensor and the resulting signals are interlaced to form an image.

In U.S. Pat. No. 4,581,649, "Image Pickup System" by Morokawa, an image system is disclosed. The image system has an image sensor which includes a plurality of photodetectors arranged in two dimensions and an optical system having a lens for forming an image on the image sensor so that the image sensor produces picture data. A vibrator, comprising a pair of piezo-electric vibrator elements, is provided for vibrating the image on the image sensor so as to oscillate the picture data. A scanner is provided to be operative in synchronism with the vibration of the image for changing the oscillated picture data to data for a fixed image.

U.S. Pat. No. 4,755,876, "Image Scanner" by Dangler, discloses and image scanner which utilizes a dither plate to steer an image onto a sparsely-populated image sensor. Precisely controlled motors are used to properly position a pair of dither plates mounted for movement on orthogonal axes to provide "X" and "Y" scan directions.

U.S. Pat. No. 4,633,317, "Electro-Optical Detector System" by Uwira et al, discloses a high resolution electro-optical detector having a mosaic CCD. The CCD is configured as a sparse array of sensing elements separated by interstices. A mirror, suspended on gimbals, is electro-magnetically energized to periodically displace the image in a stepwise manner along a closed rectangular trajectory. The displacement allows the sensing elements to capture image information which would otherwise intersect the interstices. In further embodiments, the image is offset by rotating an optical component, such as an optical wedge or inclined optical plate.

U.S. Pat. No. 4,967,264, "Color Sequential Optical Offset Image Sampling System" by Parulski et al, discloses an image system incorporating multiple glass plates mounted at angles on a rotating filter wheel. The glass plates are positioned so as to displace a beam of light by a specific distance, each in a different direction. The image sensor's pixels sequentially receive the light passing through each of the filters and converts the image formed by the light to corresponding electrical signals. The electrical signals from each image are reordered by interleaving, to form an image with increased resolution.

The precisely controlled motors used by Dangler and the piezo-electric elements used by Robinson and Morokawa are expensive components which are not appropriate for a high quantity and/or low cost system. Furthermore, the high voltage requirements of the piezo-electric elements may not be desirable for consumer products. Size constraints indicate that the magnetically energized mirror of Uwira et al may not be suitable in compact devices. In addition, the apparatus of Uwira et al comprising a rotating optical component is susceptible to aberrations in the optics. Parulski et al's filter wheel requires uniformity of the multiple glass plates. Therefore, though each of these inventions have achieved a certain degree of success, a need continues to exist for an image displacement mechanism which is robust, compact in size, inexpensive and simple to manufacture, and is insensitive to glass aberrations.

SUMMARY OF THE INVENTION

The apparatus of the present invention increases the resolution of an image by utilizing a single, non-rotating transparent plate to displace an image beam to a plurality of discrete sampling positions. More generally, the apparatus of the present invention includes a source of light, means for positioning a light receiving element in the path of the light beam generated by the light source, and transparent means comprised of a single optical member interposed in the path of the light beam for controlling the placement of the light beam on the light receiving element. By tilting the optical member interposed in the path of the light beam for controlling the placement of the light beam on the light receiving element. By tilting the optical member, without causing rotation about its optical axis, the light beam is displaced through a plurality of discrete positions along a two-dimensional trajectory.

More particularly, according to the present invention, there is provided an imaging system comprising a light source directed along a path through an image so as to generate an image beam; an image sensor positioned in the path of the image beam having active and inactive areas; transparent means comprised of a single optical member interposed in the path of the image beam for controlling the placement of the image beam; and means for tilting the single optical member, without causing rotation, to displace the image beam through a plurality of discrete positions along a two-dimensional trajectory, including, in particular, a closed circular trajectory.

In the preferred embodiment, an image beam is directed along a path through an optical lens system, a plate assembly, and a color filter wheel, and impinges on a CCD (Charge Coupled Device) image sensor. The CCD is formed from an array of photosensitive elements, generally referred to as "pixels", for generating signals indicative of the intensity of the image beam incident thereon. The color filter wheel is rotatably mounted perpendicular to the image beam. The plate assembly comprises a single, non-rotating transparent plate mounted on a support plate. This plate assembly is mounted on flexures or compression springs so as to allow the assembly to deflect under a change in load to the support plate. A cam, positioned adjacent to the support plate, is rotated about the optical axis to apply a changing load and deflect the transparent plate in a plurality of discrete sampling positions. At each sampling position, the deflected transparent plate displaces the beam of light through a substantially constant area of the transparent plate by a fraction of the distance between adjacent pixels forming the CCD. The CCD sequentially receives the light passed through the transparent plate and color filter wheel and converts the image formed by the light to corresponding electrical signals, the amplitude of which is proportional to the intensity of illumination occurring at each pixel. The electrical signals from each pixel are stored and reordered by interleaving to form an image with increased resolution.

Accordingly, the primary objective of the present invention is to provide an improved optical offset image sampling system.

Another object of the present invention is to increase the resolution of an image by capturing multiple signal values from each photosensitive element using optical offset sampling.

A further object of the present invention is to provide a compact offset image sampling system whereby the image beam passes through a substantially constant area of a single, non-rotating transparent plate thereby resulting in an apparatus less sensitive to material variations and aberrations in such a transparent plate.

The invention has the advantage of providing a simple system which does not require precise control, is inexpensive to manufacture, and is insensitive to vibrations.

These objects are given only be way of illustrative examples. Therefore, other desirable objectives and advantages inherently achieved by the disclosed invention may occur or become apparent to those skilled in the art.

BRIEF DESCRIPTION OF THE DRAWINGS

The foregoing and other objects, features, and advantages of the invention will be apparent from the following more particular description of the preferred embodiments of the invention, as illustrated in the accompanying drawings, wherein.

DETAILED DESCRIPTION OF THE PREFERRED EMBODIMENTS

The following is a detailed description of the preferred embodiments of the invention, reference being made to the drawings in which the same reference numerals identify the same elements of structure in each of the several Figures.

Figure 1:
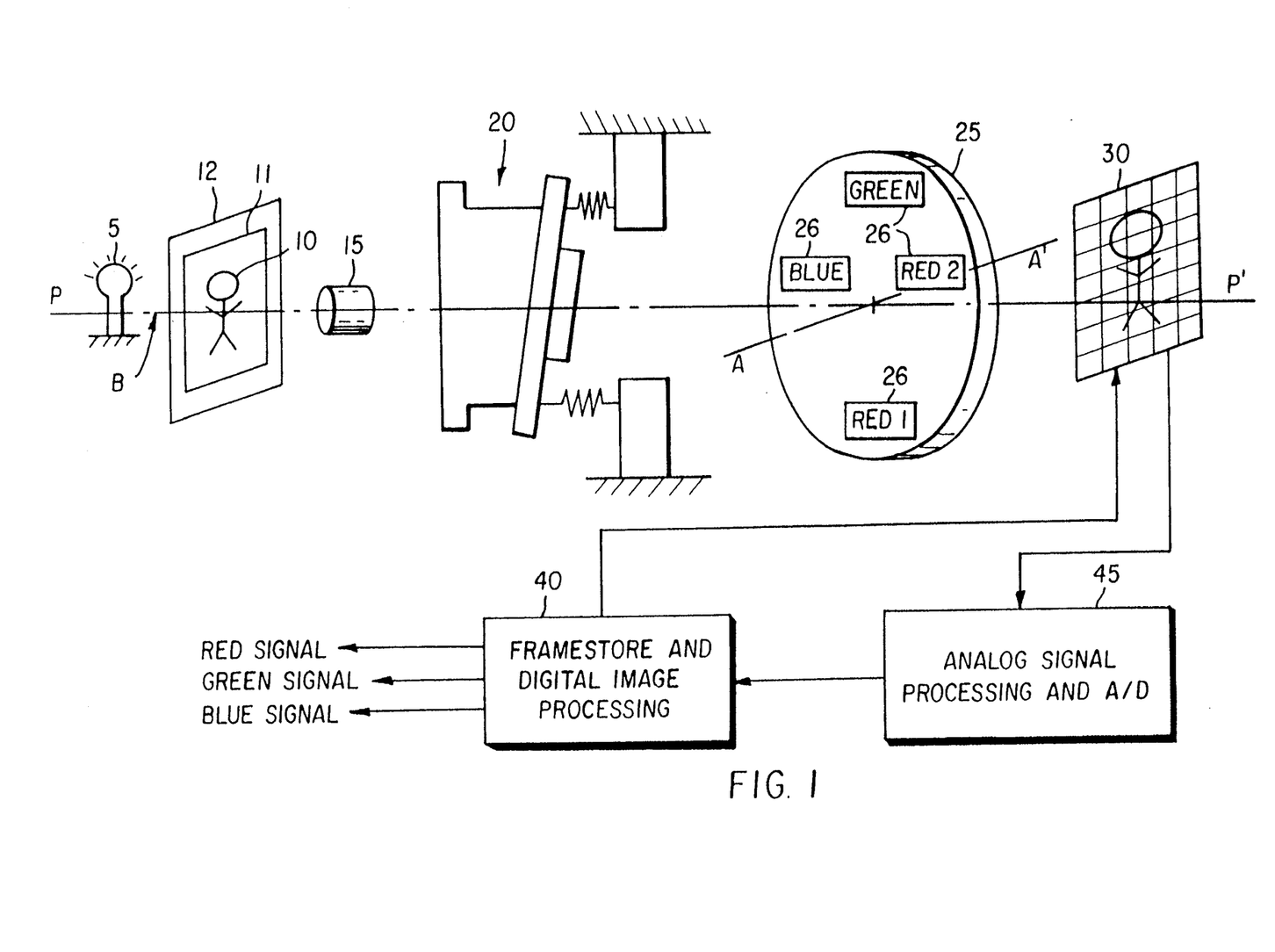
FIG. 1 is a diagram of the preferred embodiment of the present invention.

FIG. 1 shows a preferred embodiment of the present invention. A fixed image 10 on an image support 11 is illuminated by a light source 5. An example of such an image support 11 would be a conventional photographic negative or slide. The image support 11 is positioned in a fixture 12. The resulting image beam B is directed along an optical axis P—P' through an optical lens system 15, a plate assembly 20, and a color filter wheel 25, and impinges on a CCD (Charge Coupled Device) image sensor 30. The framestore block 40 and the processing block 45 are used for processing the information captured by the CCD 30.

The optical lens system 15 focuses the image 10 on the image support 11 onto the CCD 30. The lens system 15 comprises a plurality of lens elements.

The color filter wheel 25 is rotatably mounted perpendicular to the image beam B and comprises a plurality of filters 26. In the preferred embodiment four filters 26, further identified as RED1, RED2, GREEN, and BLUE, comprise the color filter wheel 25. As described in U.S. Pat. No. 4,922,333 titled "Video Copying Apparatus Spectrally-Responsive to Slides or Negative" by Nutting et al, by providing two separate red filters in the filter wheel, the spectral pass bands of the red filters can be matched to the separate and distinctive red spectral responses of a photographic negative or slide. Though other shapes and sizes are possible, in the preferred embodiment the filters 26 are approximately 1 cm square in shape for ease of manufacture. The color filter wheel 25 rotates, by means not shown, about axis denoted A—A' which is positioned parallel to the optical axis P—P'. Axis A—A' is positioned such that the filters 26 intersect the optical axis P—P' when the color filter wheel 25 is rotated.

Figure 2:
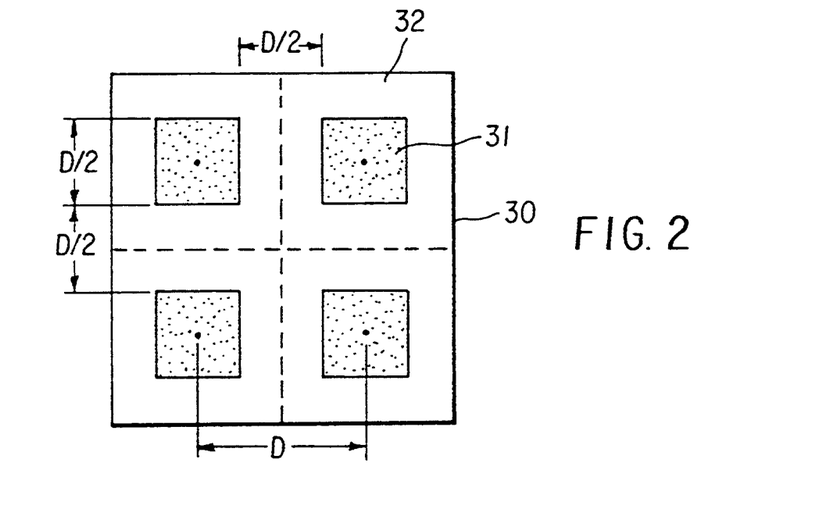
FIG. 2 illustrates one region of a CCD (Charge Coupled Device) shown in FIG. 1.

Positioned along the optical axis P—P' is a CCD 30, which is a monochrome image sensor. FIG. 2 illustrates one region of the CCD 30. Referring to FIG. 2, the CCD 30 comprises an array of sensing elements 31, also called "pixels", whose center-to-center distance is a value D. As shown in FIG. 2, in the preferred embodiment the pixels 31 are square in shape, though other shapes are possible. The interstices 32 which exist between the pixels are inactive in image detection. In the preferred embodiment, the interstices 32 equally space the pixels 31 by a horizontal and vertical distance D/2. An example of such a CCD 30 is Kodak Model KAF-0400, an image sensor manufactured by the Eastman Kodak Company of Rochester, N.Y. Each pixel 31 provides an electrical output signal proportional to the intensity of the illumination at each pixel 31. Referring back to FIG. 1, the electrical output signals from the CCD 30 are directed as inputs to an analog signal processing and analog to digital (A/D) converter block 45. Within block 45 the signals from the CCD 30 are amplified, sampled, and converted to digital signals. The digital signals from the A/D converter portion of the block 45 are directed to a framestore and digital image processing block 40 which outputs a RED, GREEN, and BLUE signal on three separate channels. These signals may then be used to recreate the image on a color viewing screen or on a hard copy print.

Since the interstices 32 are inactive areas, only the pixels 31 can produce the electrical signals which form an image. To form an increased resolution image, the image 10 on the image support 11 can be moved relative to the CCD 30 to allow each pixel 31 to scan several adjacent areas of the image support 11. Such is the purpose of the plate assembly 20; that is, the plate assembly displaces the image beam B. Thus, the image 10 is shifted relative to the CCD 30. By displacing the image beam B, the slightly different positions of the image 10 can be scanned by the pixels 31 of the CCD 30.

Figure 3:
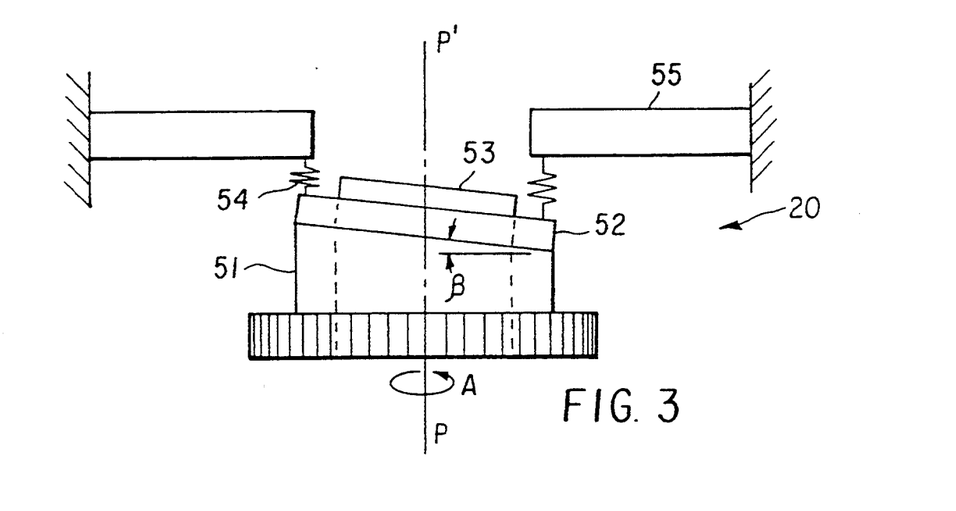
FIG. 3 shows the plate assembly shown in FIG. 1.

Referring now to FIG. 3, the plate assembly 20 comprises a cam 51, a support plate 52, a transparent plate 53, flexures or compression springs 54, and a base support 55. Cam 51 rotates about the optical axis P—P' as illustrated by the arrow A in FIG. 3. As shown in FIG. 3, the material from the center cylindrical region of the cam 51 is removed to allow the image beam B to be directed along the optical axis P—P' through the cam 51. One surface of the cam 51 abuts the support plate 52. In the preferred embodiment, the cam 51 is made of delrin and the surface abutting the support plate 52 is formed by taking an angular cut of value $\beta$ from horizontal. This angular cut results in a horizontal differential in height across the surface of the cam 51. This angular cut of value $\beta$ is exaggerated as shown in FIG. 3.

Figure 4:
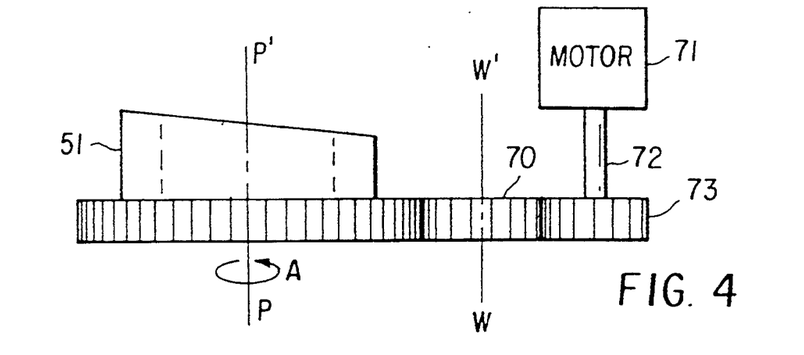
FIG. 4 illustrates the rotation means of the cam shown in FIG. 3.

FIG. 4 shows the preferred means by which the cam 51 rotates about the optical axis P—P'. A drive gear 73 is mounted to the rotary shaft 72 of stepper motor 71. The drive gear 73 contacts an intermediate gear 70 which rotates about axis W—W'. Axis W—W' is parallel to the optical axis P—P' about which the cam 51 rotates. The intermediate gear 70 contacts a flange of the cam 51 which is formed in the shape of gear teeth. When the stepper motor 71 operates, the rotary shaft 72 rotates the drive gear 73, which, in turn, rotates the intermediate gear 70. The intermediate gear 70 then rotates the cam 51 about the optical axis P—P'. In the preferred embodiment, the stepper motor 71 is a conventional 24 position stepper motor and the gears 70 and 73 are machined from delrin. The gear ratios of the gears 70 and 73 allow the stepper motor 71 sufficient positioning control of the cam 51.

Referring back to FIG. 3, in the preferred embodiment, the support plate 52 is circular in shape for ease of manufacture and is centered about the optical axis P—P'. Preferably, the support plate 52 is made of a lightly tempered spring steel. The center cylindrical region of the support plate 52 is removed to allow the image beam B to pass through the support plate 52. Mounted on the support plate 52, centered about the optical axis P—P', is the transparent plate 53. In the preferred embodiment, this transparent plate 53 is made of optical glass approximately 11 millimeters in diameter, 1 millimeter thick, with two parallel optical surfaces. For ease of manufacture, the transparent plate 53 is circular in shape, though other shapes are possible. Alternatively, the transparent plate 53 could be made of plastic. However, such a material would be more susceptible to scratches and the adhesion of particles, for example, dust or dirt. As a result, glass is the preferred material for the transparent plate 53.

Figure 5:
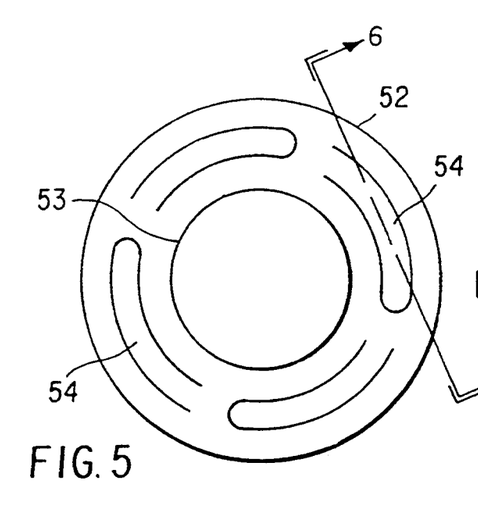
FIG. 5 shows a view of the support plate shown in FIG. 3.
Figure 6:
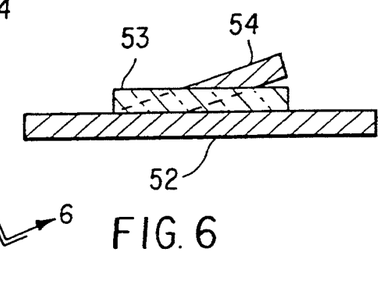
FIG. 6 is a sectional view taken along the section lines 6—6 of FIG. 5.

Attached to the support plate 52 are a plurality of flexures or compression springs 54. When the invention is assembled, the flexures or compression springs 54 will contact the base support 55. In the preferred embodiment, as shown in FIG. 5, four flexures are used; each an integral component of the support plate 52. The flexures 54 are uniform in size, shape, and height. As shown in FIG. 5, the transparent plate 53 is centered on the support plate 52 and the four equally spaced flexures 54 surround the transparent plate 53. Each flexure 54 is formed from the support plate 52 by punching two long, thin parallel arcs connected by an arc. The punched material is then bent away from the remaining material of the support plate 52 so as to be positioned on the side of the support plate 52 containing the transparent plate 53. FIG. 6, a sectional view taken along the section lines 6—6 of FIG. 5, shows the orientation of one of the flexures 54 relative to the support plate 52 and transparent plate 53.

Figure 7:
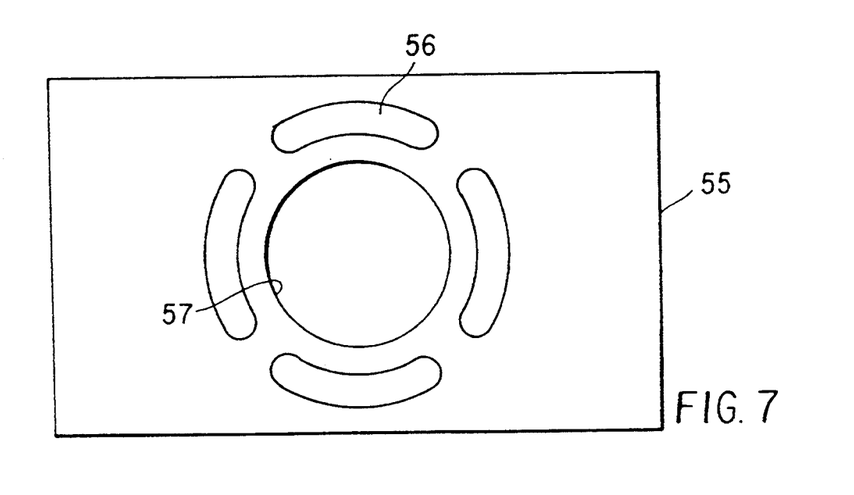
FIG. 7 is a front elevation of the base support as shown in FIG. 3.

Referring now to FIG. 7, to ensure that the flexures 54 compress rather than rotate relative to the support plate 55, four recesses 56 in the base support 55 are utilized. When the apparatus is assembled, each flexure 54 is seated in a recess 56 to ensure compression so that there is no rotation of the transparent plate 53. As shown in FIG. 7, four equally spaced recesses 56 surround an opening 57 in the base support 55 through which the image beam B passes. Each recess 56 is shaped similarly to a flexure 54 but is slightly larger in size to allow the flexure 54 to seat properly. In the preferred embodiment, each recess 56 is approximately 0.010 inches deep.

Referring back to FIG. 6, at a minimum, the flexure 54 must be raised to a height above the support plate 52 greater than the height differential of cam 51 plus the depth of the recesses 56. This minimum value is required to ensure contact between the support plate 52 and the base support 55 in the assembled state.

Figure 8:
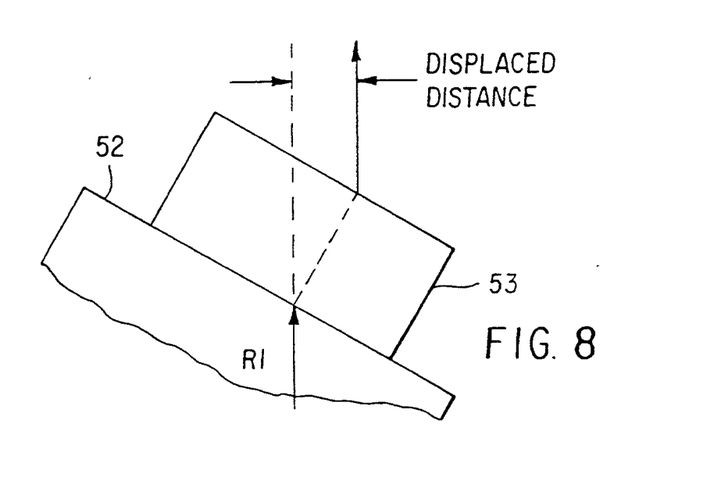
FIG. 8 shows the displacement of the image beam as it passes through the transparent plate.

As mentioned previously, the plate assembly 20 shifts the image 10 relative to the CCD 30 by displacing the image beam B so that the image 10 can be scanned by the pixels 31 of the CCD 30. Referring back to FIG. 3, during the operation of the plate assembly 20, the cam 51 rotates about the optical axis P—P'. As a result, the angled surface of the cam 51 tilts the support plate 52 which, in turn, compresses portions of the flexures 54 against the base support 55. When the flexures 54 compress, both the support plate 52 and transparent plate 53 are tilted to the orientation of the surface of the cam 51. Simultaneously, the image beam B is directed along the optical axis P—P' through the cam 51 and support plate 52. When the image beam B passes through the tilted transparent plate 53, the image beam B is displaced. Referring to FIG. 8, the parallel optical surfaces of the tilted transparent plate 53 are positioned at an angle so as to cause an incident ray R1 of the image beam B to be displaced a distance equal to a fraction of the pixel pitch D. This orientation of the transparent plate 53 forms one of a plurality of discrete sampling positions. This initial position is referenced by a small slot, not shown, in the cam's 51 surface.

In the preferred embodiment, four discrete sampling positions are utilized. To obtain the remaining three discrete sampling positions, the cam 51 is rotated further about the optical axis P—P' by a known rotational value of approximately 90 degrees. In this manner, one complete revolution of the cam 51 produces four discrete sampling positions. As the cam 51 rotates to each sampling position, the transparent plate 53 is again tilted to the orientation of the surface of the cam 51 and the image beam B is again displaced by the same distance, but in an orthogonal direction. At each sampling position the displaced image beam B is displaced in a different direction because of the unique orientation of the transparent plate 53.

Figure 9:
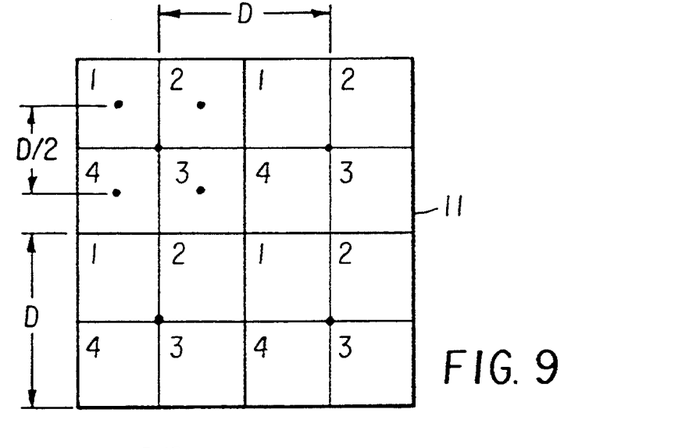
FIG. 9 illustrates one region of the image support which corresponds to the region of the CCD shown in FIG. 2.
Figure 10:
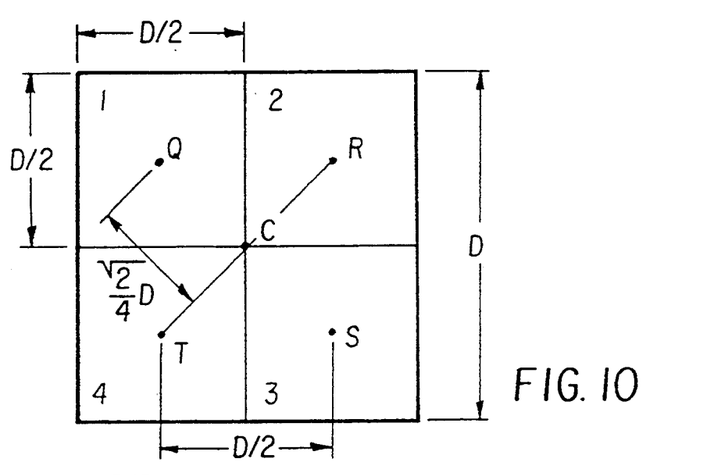
FIG. 10 is an enlargement on one section of the image support as shown in FIG. 9.

FIG. 9 shows the region of the image support 11 which corresponds to the region of the CCD 30 shown in FIG. 2. Note that if the image 10 on this portion of the image support 11 is not shifted, only the information of the image 10 directly impinged by the pixels 31 would be captured by the CCD 30. However, since the present invention shifts the image 10 to four discrete sampling positions by displacing the image beam B, each pixel 31 of the CCD 30 captures the image information from four adjacent areas of the image 10. As shown in FIG. 9, the four adjacent areas of the image 10 captured by one pixel 31 correspond to a set of four quadrants numbered 1, 2, 3, and 4. FIG. 10 is an enlargement of one set of quadrants. Note that each quadrant numbered 1, 2, 3, and 4 is square in shape and equal in size to one pixel 31.

In the preferred embodiment, at each discrete sampling position the image beam B is displaced a distance $$\frac{\sqrt{2} D}{4}.$$

As shown in FIG. 10, this distance corresponds to a distance from the centerpoint of the four quadrants, marked by the letter "C", to the centerpoint of quadrant 1, marked by the letter "Q". Since the quadrants 1, 2, 3 and 4 are square, this distance $$\frac{\sqrt{2} D}{4}$$

is also equal to the distance from "C" to the letters "R", "S", and "T", which are, respectively, the centerpoints of quadrants 2, 3, and 4. Notice that the area bounded by the letters Q, R, S, and T is the location on the image support 11 that would be directly impinged by the pixel 31 if the image 10 was not shifted. Notice also that these four lines CQ, CR, CS, and CT, form two perpendicular lines.

When cam 51 rotates to the first sampling position, the transparent plate 53 is tilted to an orientation so as to displace the image beam B by a distance $$\frac{\sqrt{2} D}{4}$$

along the line CQ toward the letter "C". As such, the displaced image beam B displaces all the quadrants of the image 10 numbered 1 directly into the path of pixels 31. The corresponding electrical output proportional to the intensity of the illumination at a pixel 31 is captured by the CCD 30. The cam 51 then rotates to the second sampling position. At this position the image beam B is again displaced by a distance $$\frac{\sqrt{2} D}{4},$$

but is now oriented in a direction along the line CR toward the letter "C". As such, all the quadrants of the image 10 numbered 2 are directed into the path of pixels 31. The third and fourth sampling positions allow quadrants 3 and 4, respectively, to be placed directly in the path of pixels 31. Since each pixel 31 of the CCD 30 captures information from the four quadrants 1, 2, 3, 4, the resolution of the image increases by a factor of four.

As shown in FIG. 3, the angle $\beta$ of the surface of cam 51 resulting in the distance $$\frac{\sqrt{2} D}{4}$$

can be calculated from the formula:

$$\frac{\sqrt{2} D}{4} = T \sin \beta \left( 1 - \frac{\cos \beta}{\sqrt{N^2 - \sin^2 \beta}} \right)$$

if the CCD 30 pixel pitch D, the index of refraction N of the transparent plate 53, and the thickness T of the transparent plate 53, are known. For example, in the preferred embodiment, the horizontal pixel pitch D of the CCD 30 is 9.0 microns. Using a glass plate with an index of refraction N equal to 1.5 and a thickness T of 1.0 millimeters, the angle $\beta$ equals 0.55 degrees or 0.0096 radians. This angular cut of value $\beta$ corresponds to an approximate 0.00864 inch horizontal differential in height across the surface of the cam 51.

Notice that the angled surface of cam 51 results in the transparent plate 53 being tilted at the angle $\beta$ at all times. Therefore, the image beam B is always being displaced by a distance $$\frac{\sqrt{2} D}{4}.$$

Figure 11:
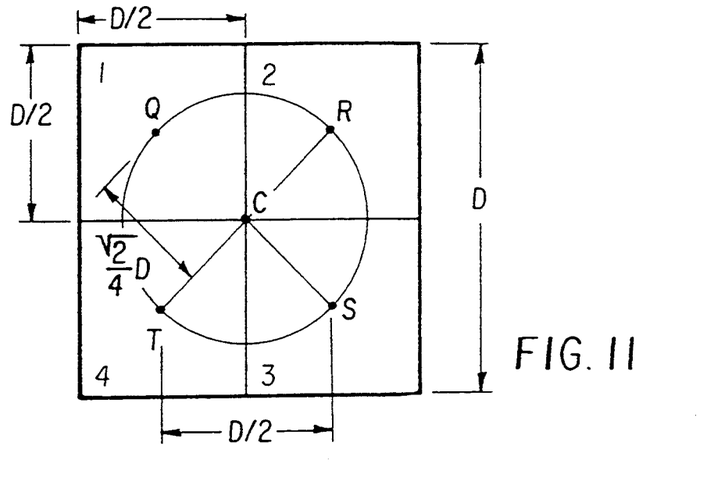
FIG. 11 illustrates the closed circular trajectory of the displaced image beam on the enlargement of the section of the image support as shown in FIG. 10.

As a result, when the cam 51 rotates about the optical axis P—P', the image beam B is following a closed circular trajectory as it moves between the four discrete sampling positions. As shown in FIG. 11, the circular trajectory has a radius $$\frac{\sqrt{2}\,D}{4}$$

centered about the pixel's 31 centerpoint, marked by the letter "C". Therefore, any four different, but equally spaced, positions along the closed circular trajectory could be selected as the discrete sampling positions. Furthermore, additional or fewer sampling points than the current four sampling points could be used. However, special processing of the signals from the CCD 30 may be required if the selected sampling points sample the same portion of an image 10, resulting in the capture of redundant information.

Note that the transparent plate 53 is a non-rotating component which is centered about the optical axis P—P'. Since the image beam B is directed along the optical path P—P' before it is displaced, the image beam B intersects the transparent plate 53 at a substantially constant area of the transparent plate 53 for all of the sampling positions.

Precise control of the angled surface of cam 51, the transparent plate thickness, and the cam orientation are less critical. The inventors have determined that an error in the system still produces an acceptable image. Furthermore, since the transparent plate 53 does not rotate, the apparatus is more "tolerant" of wedge error and other aberrations in the transparent plate 53.

To obtain the color information of the image, the color filter wheel 25 is rotated one revolution for each discrete sampling position. In the preferred embodiment, though two red filters 26, RED1 and RED2, are provided, only one of the two red filters 26 is used in conjunction with the BLUE and GREEN filters 26 to obtain the color information. (Refer to previously mentioned U.S. Pat. No. 4,922,333 by Nutting et al.) The operation of the invention is such that the cam 51 rotates and positions the transparent plate 53 in the first sampling position. The color filter wheel 25 rotates one revolution, stopping to allow three of the four filters 26 to be positioned in the path of the image beam B. For example, the color filter wheel 25 is rotated and the GREEN filter is placed in the path of the image beam B. The CCD 30 captures the green image and stores it in the framestore 40. The color filter wheel 25 is advanced to place the BLUE, RED1 or RED2 filters 26 in the imaging path. For each filter 26, the image is stored in the framestore 40. When the red, green, and blue information has been stored, the cam 51 rotates and positions the transparent plate 53 in the second sampling position. Once again, the color filter wheel 25 rotates one revolution, stopping to allow three of the four filters 26 to be positioned in the path of the image beam B and allowing the image to be captured by the CCD 30. This process is repeated for the third and fourth sampling positions. As mentioned previously, the electrical output signals are then processed to produce a RED, GREEN, and BLUE signal on three separate channels. These signals may then be used to recreate the image on a color viewing screen or on a hard copy print. If monochrome information is to be obtained, only the GREEN filter 26 of the color filter wheel 25 is used.

An alternative technique to process the electrical output signals is to interleave the discrete sampling position information with the corresponding red, green, blue information on a host computer system. This technique would provide for a reduced cost and simpler image sampling system. An alternative method of operation of the image sampling system is to rotate the cam 51 to the four discrete sampling positions each time one color filter 26 is positioned in the path of the image beam B.

Although the color filter wheel 25 is shown positioned between the optical lens system 15 and the CCD 30, it is possible to position the color filter wheel 25 elsewhere. For example, the color filter wheel 25 can be positioned between the image support 11 and the optical lens system 15. Similarly, the plate assembly 20 is shown positioned between the optical lens system 15 and the CCD 30. It likewise can be positioned elsewhere in the path of the image beam B, for example, between the image support 11 and the optical lens system 15. Further, the image does not need to be a transparent image. If the image is not transparent, the light source would be used to illuminate the non-transparent image.

The invention has been described in detail with particular reference to a presently preferred embodiment, but it will be understood that variations and modifications can be effected within the spirit and scope of the invention. For example, though the invention describes the use of one cam and cam actuating means to control the placement of the image beam B, it is understood that a plurality of cam and cam actuating means could be used for such control. In addition, while the invention describes the apparatus as increasing the resolution of an image using an image sensor, the apparatus can be used for increasing the scanning resolution of a light beam directed toward a light receiving element.

What is claimed is:

1. An optical imaging apparatus for increasing the resolution of an image comprising:
    a source of light;
    means for positioning an image-bearing support in the path of the light so as to generate an image beam directed along an optical axis;
    an image sensor positioned in the path of the image beam in an X,Y plane perpendicular to the optical axis, said image sensor having active areas separated by inactive interstices between the active areas;
    transparent means interposed in the path of the image beam for controlling the placement of the image beam on said image sensor; and
    cam means for tilting said transparent means relative to the X,Y plane, without causing rotation of said transparent means about the optical axis, to displace the image beam through a plurality of discrete positions, whereby different portions of the image beam impinge upon the active areas of said image sensor.

2. An apparatus according to claim 1, in which said cam means comprises a cam and means for actuating said cam.

3. An apparatus according to claim 2, in which said cam is in mechanical association with said transparent means.

4. An apparatus according to claim 2, in which said cam includes a hollow center to permit the light beam to be directed along the optical axis through said cam.

5. An apparatus according to claim 2, in which said means for actuating said cam comprises a motor and at least one gear connecting said motor to said cam.

6. An apparatus according to claim 1, in which said image-bearing support is transparent.

7. An apparatus according to claim 1, in which said image-bearing support is reflective.

8. An apparatus according to claim 1, in which said plurality of discrete positions is displaced along a closed circular trajectory.

9. An apparatus according to claim 1, in which said transparent means comprises a plate made of optical glass with two parallel optical surfaces.

10. An apparatus according to claim 1, in which said transparent means is tilted about said optical axis of said image beam.

11. An apparatus according to claim 1, in which said cam means comprises a cam, a motor, and connecting means to provide a mechanical association of said motor and said cam.

12. An apparatus according to claim 11, in which said connecting means comprises at least one gear connecting said motor to said cam.

13. An apparatus according to claim 11, in which said cam rotates about said optical axis of said image beam.

14. An apparatus according to claim 11, in which said cam is in mechanical association with said transparent means.

15. An apparatus according to claim 11, in which said cam includes a hollow center to permit the light beam to be directed along the optical axis through said cam.

16. A polychromatic optical imaging apparatus for increasing the resolution of an image comprising:
 a source of light;
 means for positioning an image-bearing support in the path of the light so as to generate an image beam directed along an optical axis;
 an image sensor positioned in the path of the image beam in an X,Y plane perpendicular to the optical axis, said image sensor having active areas separated by inactive interstices between the active areas;
 color filtering means for providing a sequential insertion of Red, Green, and Blue filters in the optical path of the image beam;
 transparent means comprised to a single optical member interposed in the path of the image beam for controlling the placement of the image beam on said image sensor; and
 cam means rotating about the optical axis for tilting said transparent means relative to the X,Y plane, without causing rotation of said optical member about the optical axis, to displace the sequential image beam through a plurality of discrete positions, whereby different portions of the image beam impinge upon the active areas of said image sensor.

17. An apparatus according to claim 16, in which said color filtering means comprises a color filter wheel rotatably mounted perpendicular to said image beam.

18. An optical imaging apparatus for increasing the resolution of an image comprising:
 a source of light;
 means for positioning an image-bearing support in the path of the light so as to generate an image beam directed along an optical axis;
 an image sensor positioned in the path of the image beam in an X,Y plane perpendicular to the optical axis, said image sensor having active areas separated by inactive interstices between the active areas;
 a transparent plate interposed in the path of the image beam for controlling the placement of the image beam on said image sensor;
 means for preventing rotation of said transparent plate about the optical axis; and
 a cam and cam actuating means for tilting said transparent plate relative to the X,Y plane, without causing rotation of said transparent plate about the optical axis, to displace the image beam through a plurality of discrete positions, whereby different portions of the image beam impinge upon the active areas of said image sensor.

19. An apparatus according to claim 18, in which said means for preventing rotation comprises a plurality of flexures recessed in a base support and attached to said transparent plate, thereby preventing relative rotation between said transparent plate and said base support and preventing rotation of said transparent plate about the optical axis.

20. An optical imaging apparatus for increasing the resolution of an image comprising:
 a source of light;
 means for positioning an image-bearing support in the path of the light so as to generate an image beam directed along an optical axis;
 an image sensor positioned in the path of the image beam in an X,Y plane perpendicular to the optical axis, said image sensor having active areas separated by inactive interstices between the active areas;
 a transparent plate interposed in the path of the image beam for controlling the placement of the image beam on said image sensor;
 means for preventing rotation of said transparent plate comprising a plurality of flexures recessed in a base support and attached to said transparent plate, thereby preventing relative rotation between said transparent plate and said base support and preventing rotation of said transparent plate about the optical axis; and
 a cam and cam actuating means for tilting said transparent plate relative to the X,Y plane, without causing rotation of said transparent plate about the optical axis, to displace the image beam through a plurality of discrete positions, whereby different portions of the image beam impinge upon the active areas of said image sensor.

21. An apparatus for increasing the scanning resolution of a light beam directed along an optical axis toward a light receiving element comprising:
 a source of light emitting a beam of light directed along an optical axis;
 means for positioning a light receiving element in the path of the light beam in an X,Y plane perpendicular to the optical axis;
 transparent means comprised to a single optical member interposed in the path of the light beam for controlling the placement of the light beam on said light receiving element;
 cam means for tilting said single optical member relative to the X,Y plane, without causing rotation of said transparent plate about the optical axis, to displace the light beam through a plurality of discrete positions along a two-dimensional trajectory; and
 means for preventing rotation of said single optical member, said preventing means engaging said single optical member and operative when said light beam is displaced to restrain rotary movement of said single optical member about the optical axis.

* * * * *